United States Patent [19]
Nakajima

[11] Patent Number: 4,827,168
[45] Date of Patent: May 2, 1989

[54] SEALING STRUCTURE IN A MOTOR FOR MAGNETIC DISCS

[75] Inventor: Satoshi Nakajima, Iida, Japan

[73] Assignee: Shinano Tokki Corporation, Nagano, Japan

[21] Appl. No.: 94,499

[22] Filed: Sep. 9, 1987

[30] Foreign Application Priority Data

Jun. 22, 1987 [JP] Japan .................. 62-153430

[51] Int. Cl.$^4$ .............................. H02K 7/08
[52] U.S. Cl. ............................ 310/90; 277/3; 384/478; 384/488
[58] Field of Search ........... 310/90, 67 R, 157, 88, 310/266; 384/478, 480, 488; 277/3, 53

[56] References Cited

U.S. PATENT DOCUMENTS

| | | | |
|---|---|---|---|
| 2,011,192 | 8/1935 | Comstock | 384/488 |
| 2,929,944 | 3/1960 | Shewmon | 310/67 R |
| 3,183,592 | 1/1980 | Sudo | 384/488 |
| 4,458,228 | 7/1984 | Baumgartner | 310/67 R |
| 4,703,209 | 10/1987 | Wrobel | 310/67 R |

FOREIGN PATENT DOCUMENTS

| | | | |
|---|---|---|---|
| 2004167 | 8/1971 | Fed. Rep. of Germany | 310/90 |
| 2362636 | 6/1975 | Fed. Rep. of Germany | 310/90 |
| 0091644 | 7/1981 | Japan | 310/90 |
| 0147646 | 8/1961 | U.S.S.R. | 310/90 |

*Primary Examiner*—R. Skudy
*Attorney, Agent, or Firm*—Welsh & Katz, Ltd.

[57] ABSTRACT

A sealing structure for use in efficiently and effectively preventing the egress of grease aerosol particles from a motor. The seal comprises forming a high speed air flow at an outer end of a bearing assembly of the motor, which air flow will not permit the passage of such aerosol particles outside the bearing assembly.

6 Claims, 4 Drawing Sheets

SEALING STRUCTURE IN A MOTOR FOR MAGNETIC DISCS

BACKGROUND OF THE INVENTION

The present invention relates to motors and specifically to a dust-proof sealing structure for a motor which rotates and drives magnetic discs in a magnetic disc apparatus of a computer.

Conventionally, a motor for rotating and driving magnetic discs comprises a cylindrical frame within which is a shaft with both ends supported by at least a pair of bearings. Magnetic discs are secured to the frame and rotated generally at 3,600 r.p.m.; such apparatus generally utilizes dust-proof seals, such as magnetic fluid seals or labyrinth seals.

The use of a magnetic fluid seal to prevent the entry of dust onto the magnetic heads results in an unacceptably high manufacturing cost, as magnetic fluids are expensive. Further, the surfaces of adjacent parts must be machined to a high tolerance to assure an absence of leaks. In addition, a longer shaft is required to provide a seal with magnetic fluid.

Should labyrinth seals be used to protect the magnetic discs from the effects of dust, it is necessary to uniformly and minutely form mating channels with seats of complicated cross-section, necessitating difficult machining and increased expenditures in machining and assembly work.

SUMMARY OF THE INVENTION

The motor of the present invention for use in driving magnetic discs has a shaft supported at its ends by a pair of bearings within a cylindrical frame. The cylindrical frame supports the load, which here are magnetic discs, and the dust-proof sealing structure of the subject invention is located outside one of the bearing assemblies; a cover or a magnetic fluid seal is used to seal the opposing shaft end.

As shield is mounted on an inside surface of a bearing assembly and axially extends away from said shaft, and the base of the shield away from the shaft.

A flat member or washer is provided such that said washer contacts an end face of the bearing assembly and extends axially to overlap at least the distal end of said shield.

As the frame rotates, the outer channel or seat of the bearing with the shield mounted thereon rotates; and accordingly, a high speed air flow is generated in the gap created by the overlap of the shield and the washer.

As result, aerosol particles generated by the rotation of the motor are prevented from going outside the bearing assembly because of the high speed air flow in the gap similar to a so-called "air curtain." As a result, such aerosol particles do not enter the magnetic disc apparatus.

On the other hand, the aerosol particles are also positively sealed out by means of the cover or magnetic fluid seal in the other bearing.

DETAIL DESCRIPTION OF THE PREFERRED EMBODIMENT

Figure 1:
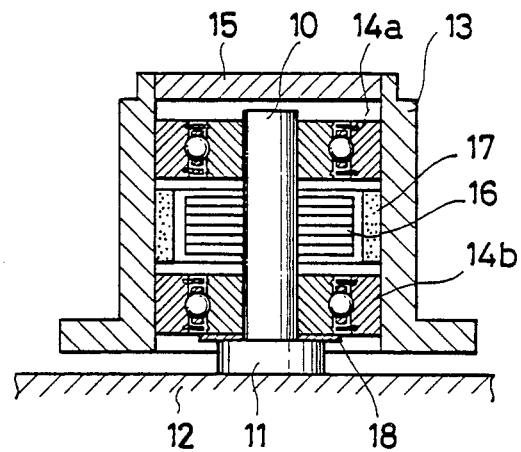
FIG. 1 is a sectional view of a first embodiment of the present invention.

Referring now to FIG. 1, there is shown a sectional view of a motor with a rotatable frame 13 for driving a load such as magnetic discs D. (FIG. 2).

The shaft 10 is secured in a vertical position within a magnetic disc apparatus by means of a flange 11 provided at one end of the shaft. A cylindrical frame 13 is rotatably supported by ball bearing assemblies 14a and 14b at the upper and lower ends of the shaft 10.

Figure 2:
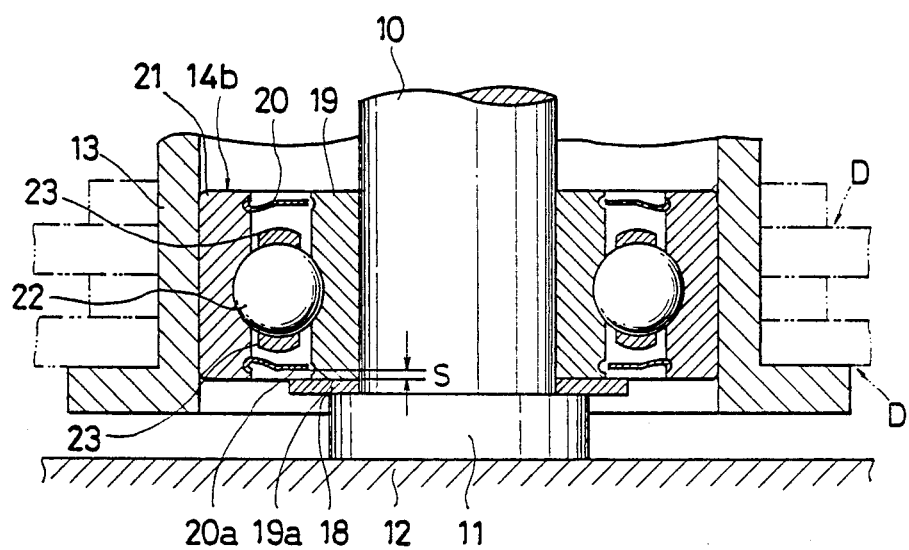
FIG. 2 is an enlarged view of a portion of FIG. 1.

The external surface of the frame 13 is adapted to carry magnetic discs D as shown in FIG. 2. Frame 13 functions as a driving hub for discs D. At the upper end of the frame 13 in FIG. 1, a cover 15 is provided which seals one end of the frame 13, thereby sealing the structure from the egress of aerosol particles as will be described.

On the middle of the shaft 10, armature 16 is located; on the interior surface of the frame 13, a field circuit 17 opposes the armature 16.

Washer 18 is a contact member held between the flange 11 and the bottom of the inner bearing seat 19. Secured to and mounted on the bearing assembly 14b are outwardly extending arms 20a of shield 20 forming a cylindrical wall extending radially outward from the shaft and free on a distal end; and, leaving a small gap, channel or airway S (about 0.05 to 0.3 mm) between the bottom face of arm 20a of the shield 20 and the side face 19a of the inner bearing seat 19. The outer circumference of the washer 18 overlaps the inner circumference of the shield 20, yet is smaller than the inner diameter of the outer bearing seat 21. It is preferable that the outer washer diameter extend further radially from the shaft 10 than the center of ball bearing 22.

With the above-mentioned structure, the frame 13 and discs D revolve at a high speed about the shaft 10 by operation of the armature 16 and the field circuit 17. The outer bearing seat 21 of bearing assemblies 14a and 14b and the shield 20 secured to the outer bearing seat 21 likewise revolves at a high speed. On the other hand, the inner bearing seat and washer do not revolve as they are secured to the shaft 10.

Since the shield 20 revolves at high speed and the washer 18 is stationary in the lower ball bearing assembly 14b, a relatively high speed air flow is generated in the airway S therebetween; therefore, the inside and the outside of the ball bearing assembly 14b will be effectively shut off and sealed from one other.

Generally, as result of the high speed rotation of the outer bearing seat 21, grease in the bearing assemblies 14a and 14b tends to be forced out of the gap at the top of the shield 20 in the form of a mist or other aerosol particulate matter, and scattered about inside the magnetic disc apparatus. However, by the subject invention, the aerosol grease is not forced out of the gap S, being restricted in its movement by the high speed air flow in the airway S in lower ball bearing assembly 14b. Moreover, in the upper ball bearing assembly 14a, since the upper end of the frame 13 is closed by the cover 15, aerosol grease particles forced out of the upper portion of the shield 20 cannot get outside the frame 13.

FIGS. 5 through 8 shown the result of measurements of dust which have actually scattered outside of the frame 13 in the form of mist in two comparative cases where the dust-proof sealing airway structure of the present invention is equipped, (FIG. 8), and where it is not equipped (FIGS. 5, 6, and 7), with a sealing structure of the present invention.

In each diagram, the ordinate shows the number of aerosol particles contained in the air sampled at 1 ft.$^3$/min. beside the motor 1. The abscissa shows the time in minutes.

The motor was rotated and stopped; and measurements were made every minute. The solid graph points indicate the measurement of aerosol particles when the motor is rotating, while the hollow graph points indicate that measurement occurred when the motor was at rest.

Figure 5:
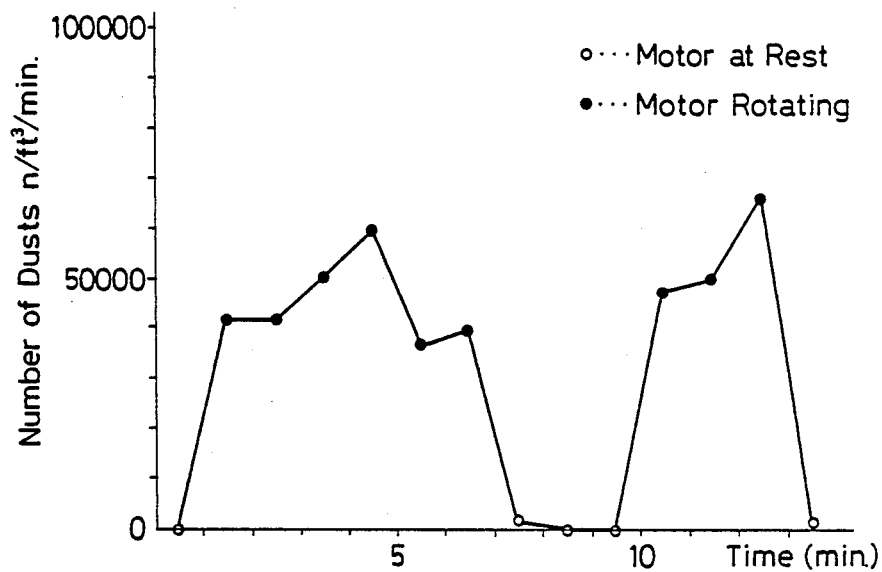
FIGS. 5 and 6 are diagrams showing the results of measurements of aerosol particles around a motor not having the sealing structure of the present invention.
Figure 6:
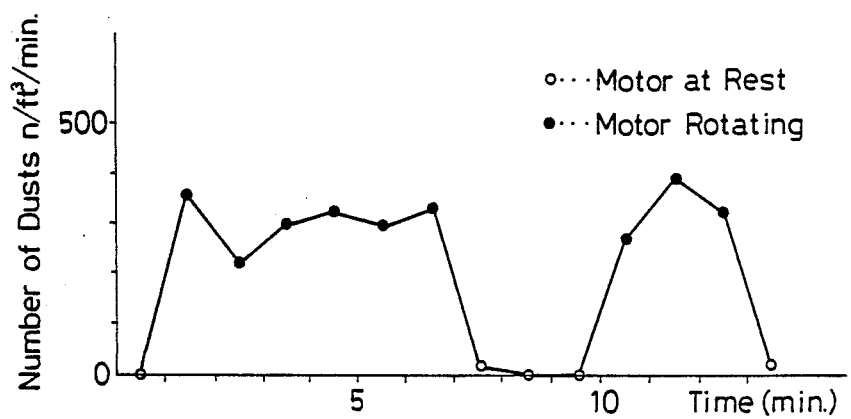

FIG. 5 shows the number of aerosol particles having size between 0.5 to 5.0 μm around a motor unit which does not have the sealing structure of the present invention; FIG. 6 shows the number of aerosol particles having a particle size of 5.0 μm or greater under the same conditions.

Figure 7:
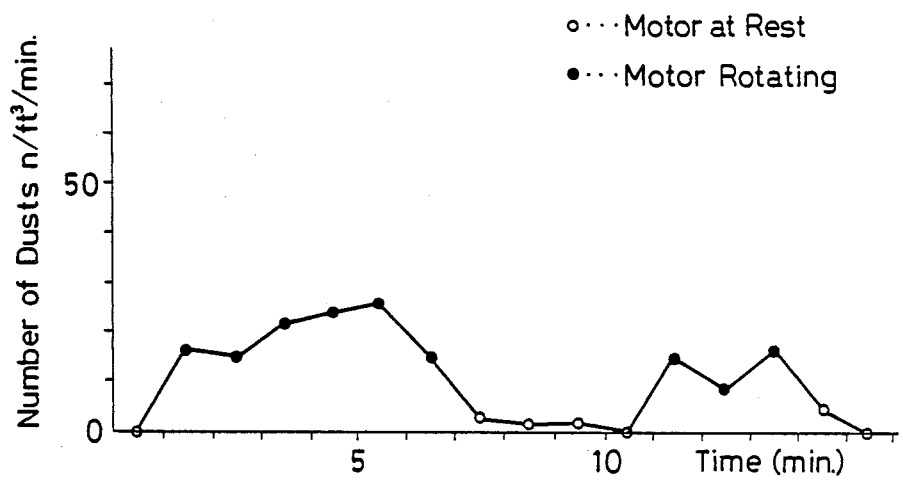
FIG. 7 is a diagram showing the result of measurements similar to FIGS. 5 and 6 from apparatus where only a cover is provided.
Figure 8:
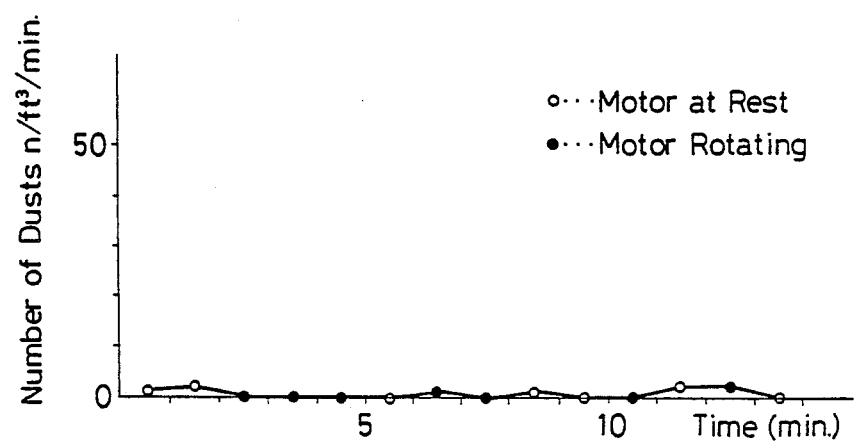
FIG. 8 is a diagram showing the result of measurements similar to FIGS. 5, 6, and 7 from apparatus where the sealing structure of the present invention is provided.

FIG. 7 demonstrates the number of aerosol particles having a particle size between 0.5 to 5.0 μm around a motor with a cover 15 but not a washer 18; and FIG. 8 shows the number of aerosol particles of the same size as FIG. 7 about a motor having washer 18, in addition to a cover 15. In these cases, aerosol particles having a particle size of 5.0 μm or larger, were not detected.

By comparing these diagrams, it is apparent, particularly from FIG. 8, that the number of aerosol particles around the motor having the sealing airway structure of the subject invention and comprising the cover 15 and the washer 18 is very small and almost nil.

Figure 3:
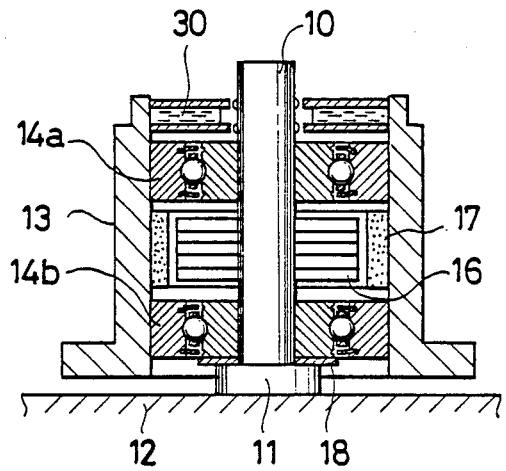
FIG. 3 is a view corresponding to FIG. 1 of a second embodiment of the present invention.

FIG. 3 illustrates another embodiment of the present invention in which a conventional magnetic fluid seal 30 is utilized to prevent the grease aerosol particles from being forced out of the upper bearing assembly 14a. In the lower bearing assembly 14b, a washer 18 is employed to prevent the grease aerosol particles from being forced out. Such a structure permits the shaft to protrude in the upper direction.

Figure 4:
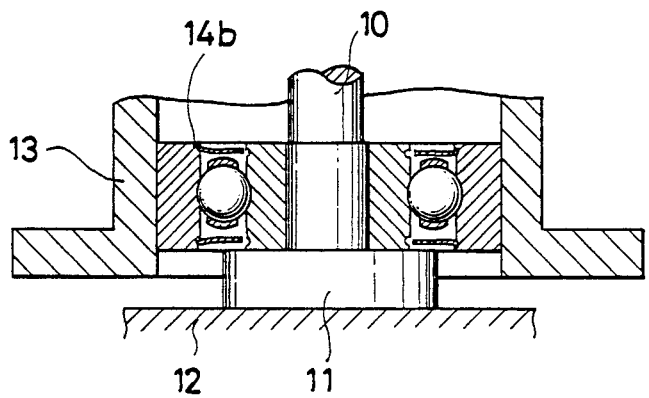
FIG. 4 is a partial sectional view of still another embodiment of the present invention.

FIG. 4 is still another embodiment of the present invention, in which flange 11 of the shaft 10 closely contacts the side face 19a of the inner bearing seal 19 of the lower ball bearing assembly 14b in place of the washer 18. In this embodiment, the flange 11 overlaps the shield 20 and forms the sealing airway in conjunction with the bearing seat 19 and shield 20.

Although in the foregoing description, grease which tends to be scattered in the form of mist from the ball bearing is referred to as aerosol particles, the sealing structure of the present invention is effective, as a matter of course, with respect to the other types of particulate matter as well.

Moreover, different bearing assemblies may utilize the subject invention, for example, roller bearings, or other bearing types.

As explained above, according to the present invention, it is possible to obtain a sealing structure which though of uncomplicated construction can positively prevent aerosol particles generated in the motor from entering the disc apparatus. Thus, manufacturing costs can be lowered as result of a reduction in the number of parts as well a relaxed tolerance control.

In addition, with the subject invention, the axial length of a motor may be shortened to make thinner motors available.

Therefore, if the axial length of the motor is the same as before, spacing between the bearings may be greater, thereby reducing the rotation run-out.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments and equivalents falling within the scope of the appended claims.

I claim:

1. In a motor having a shaft supported at both ends by a first and a second bearing assembly within a cylindrical frame for carrying and driving magnetic discs;
    a first sealing means for preventing the spread of aerosol particles from said motor, said first sealing means being secured to said frame, said first sealing means adjacent to and coaxial with said first bearing assembly for preventing the spread of aerosol particles from said motor; and
    a second sealing means comprising a high speed air flow in a channel formed shield means at an external end portion of said second bearing assembly, said high speed air flow being generated in said channel on rotation of said cylindrical frame relative to said shaft and preventing the egress of aerosol particles from said bearing assemblies.

2. The second sealing means of claim 1 wherein said channel is formed by the combination of said shield means in said bearing assembly, and a stationary washer means adjacent said external end portion of said second bearing assembly, said washer means being spaced from and partially covering said shield means.

3. The second sealing means of claim 1 wherein said shield means comprise outwardly extending cylindrical walls, said walls being supported in a fixed manner to said second bearing assembly at an end further from said shaft and being free on a distal end.

4. In a motor having a shaft supported at both ends by a first and a second bearing assembly within a cylindrical frame for carrying and driving a load;
    a first sealing means for preventing the spread of aerosol particles from said motor, said first sealing means being secured to said frame, said first sealing means adjacent to and coaxial with said first bearing assembly; and
    a second sealing means comprising a high speed air flow in a channel formed at an external end portion of said second bearing assembly, said channel comprising the combination of shield means in said second bearing assembly, and a stationary cover means adjacent said external end portion of said second bearing assembly, said cover means being spaced from and overlapping said shield means, said shield means comprising outwardly extending cylindrical walls, said walls being supported in a fixed manner to said outer bearing seat of said second bearing assembly and being free on a distal end, whereby said high speed air flow is generated in said channel on the relative rotation of said frame and said shaft thereby preventing the egress of aerosol particles from said bearing assemblies.

5. The sealing means of claim 4 wherein said shield means comprise outwardly extending cylindrical walls, said walls being supported in a fixed manner to said second bearing assembly further from said shaft and being free on a distal end.

6. In a motor having a shaft supported at both ends by a first and a second bearing assembly within a cylindrical frame for carrying and driving magnetic discs;

a first sealing means for preventing the spread of aerosol particles from said motor, said first sealing means being secured to said frame, said first sealing means adjacent to and coaxial with said first bearing assembly for preventing the spread of aerosol particles from said motor;

a second sealing means comprising a high speed air flow in a channel formed at an external end portion of said second bearing assembly, said high speed air flow being generated in said channel on rotation of said cylindrical frame relative to said shaft and preventing the egress of aerosol particles from said bearing assemblies; and said channel being formed by the combination of a shield means in said bearing assembly rotating at high speeds about said shaft, and a stationary washer adjacent said external end portion of said second bearing assembly, said washer being spaced from and partially covering said shield means.

* * * * *